Nov. 19, 1957  F. H. MILLER, JR  2,813,638
PALLETIZER
Filed Oct. 5, 1954  9 Sheets-Sheet 1
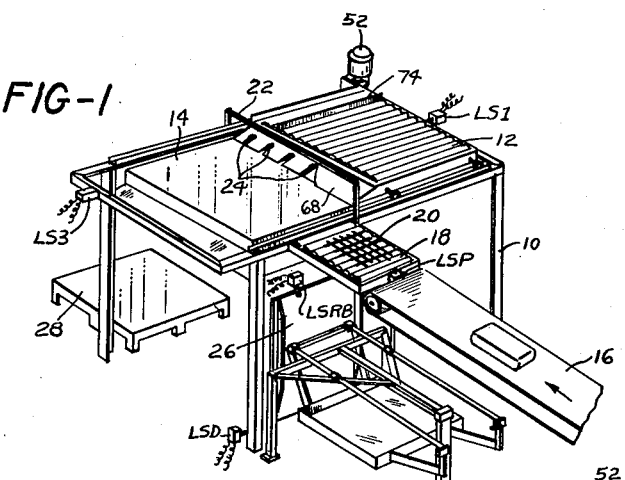
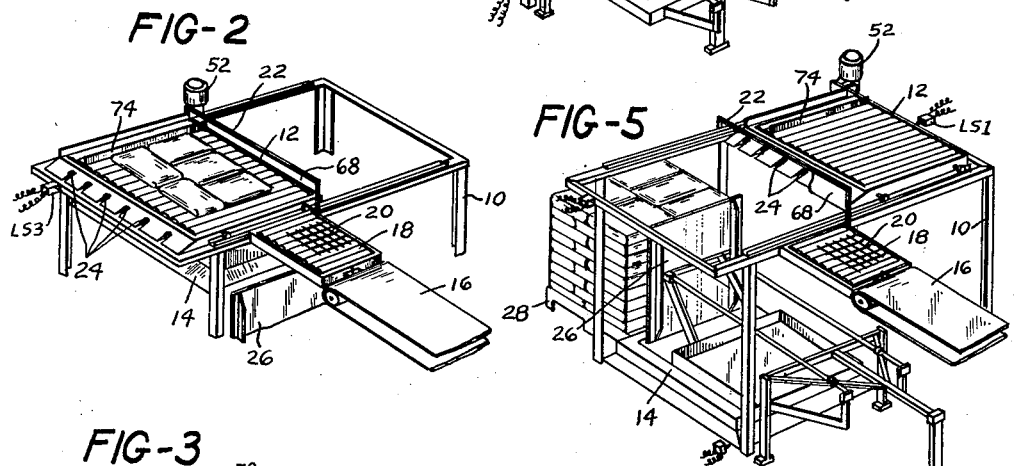
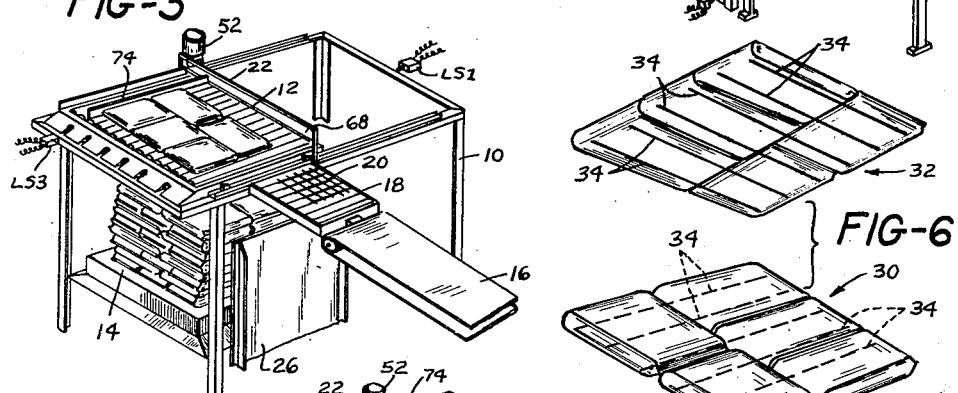
INVENTOR.
FRANK H. MILLER JR.
BY Toulmin & Toulmin
ATTORNEYS

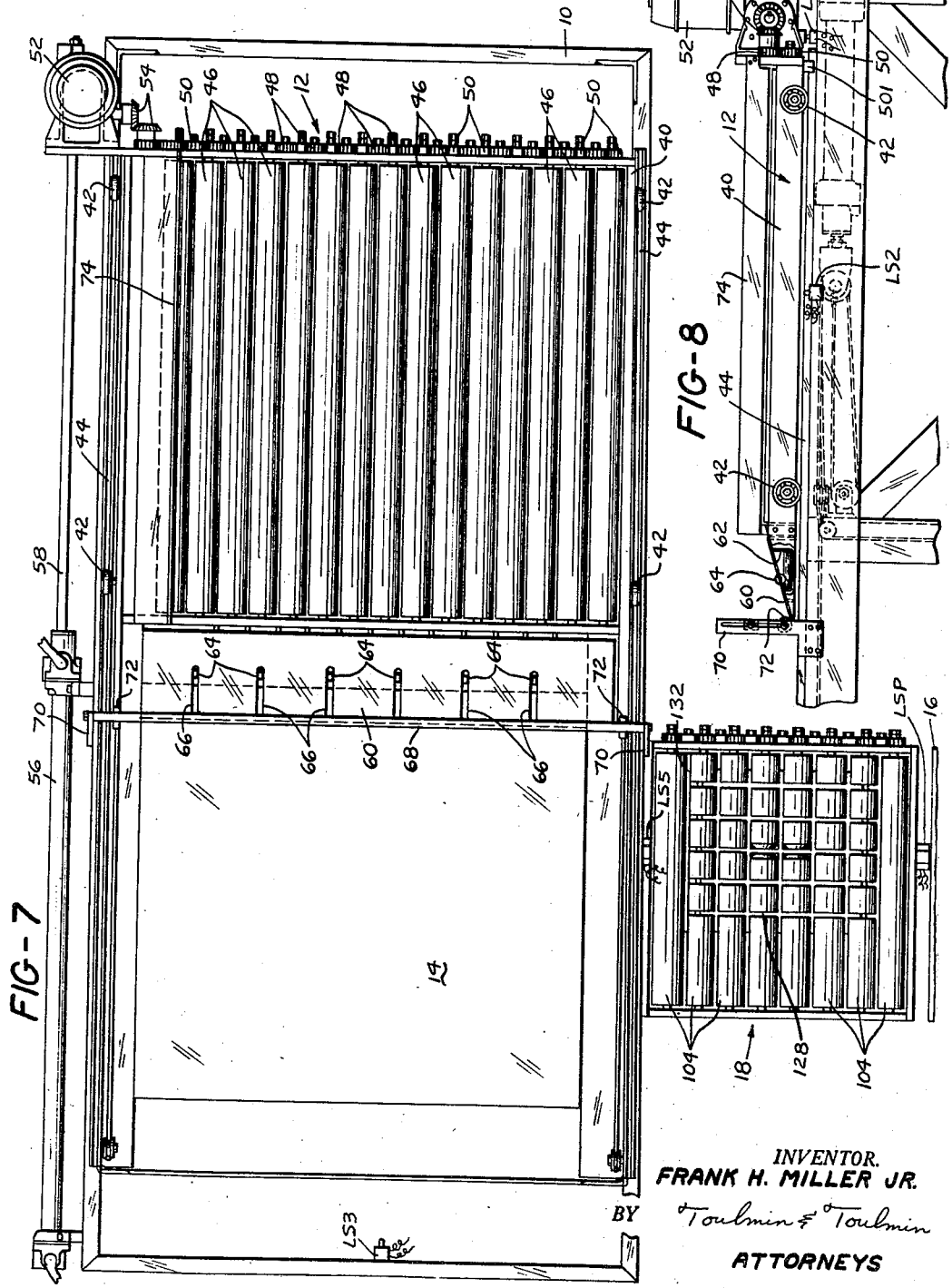

Nov. 19, 1957  F. H. MILLER, JR  2,813,638
PALLETIZER
Filed Oct. 5, 1954  9 Sheets-Sheet 3
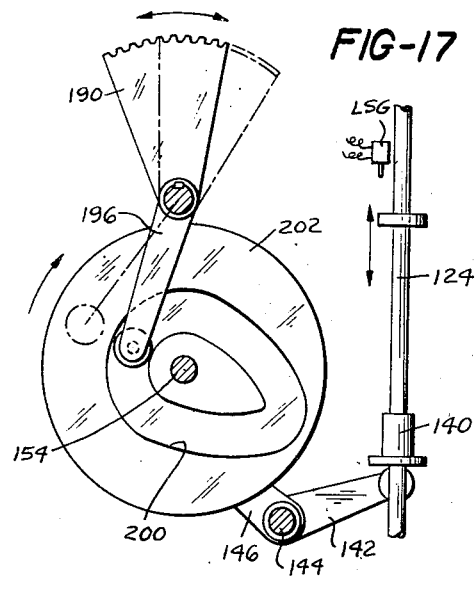
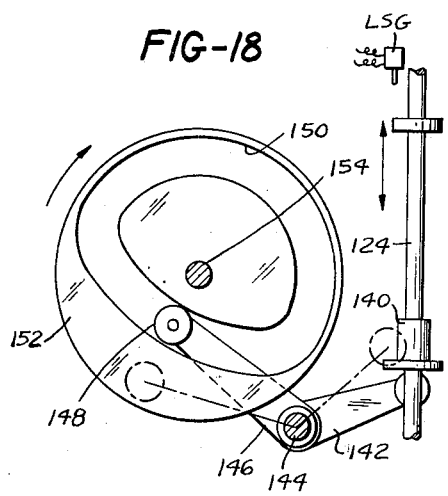
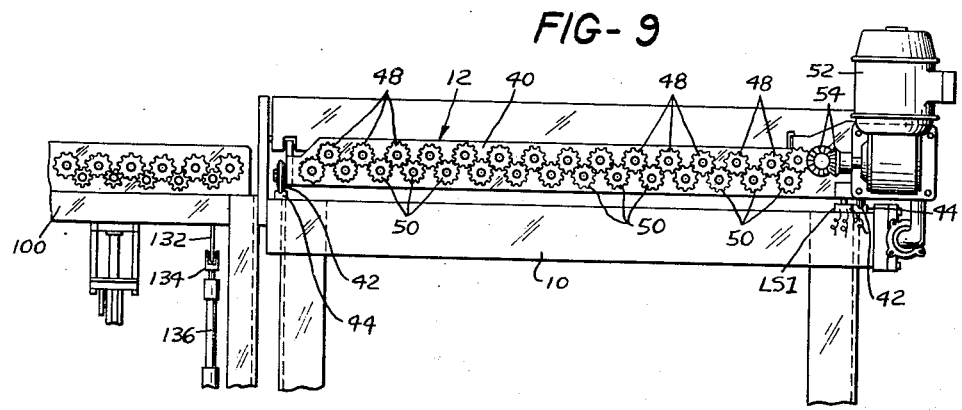
INVENTOR.
FRANK H. MILLER JR.
BY Toulmin & Toulmin
ATTORNEYS

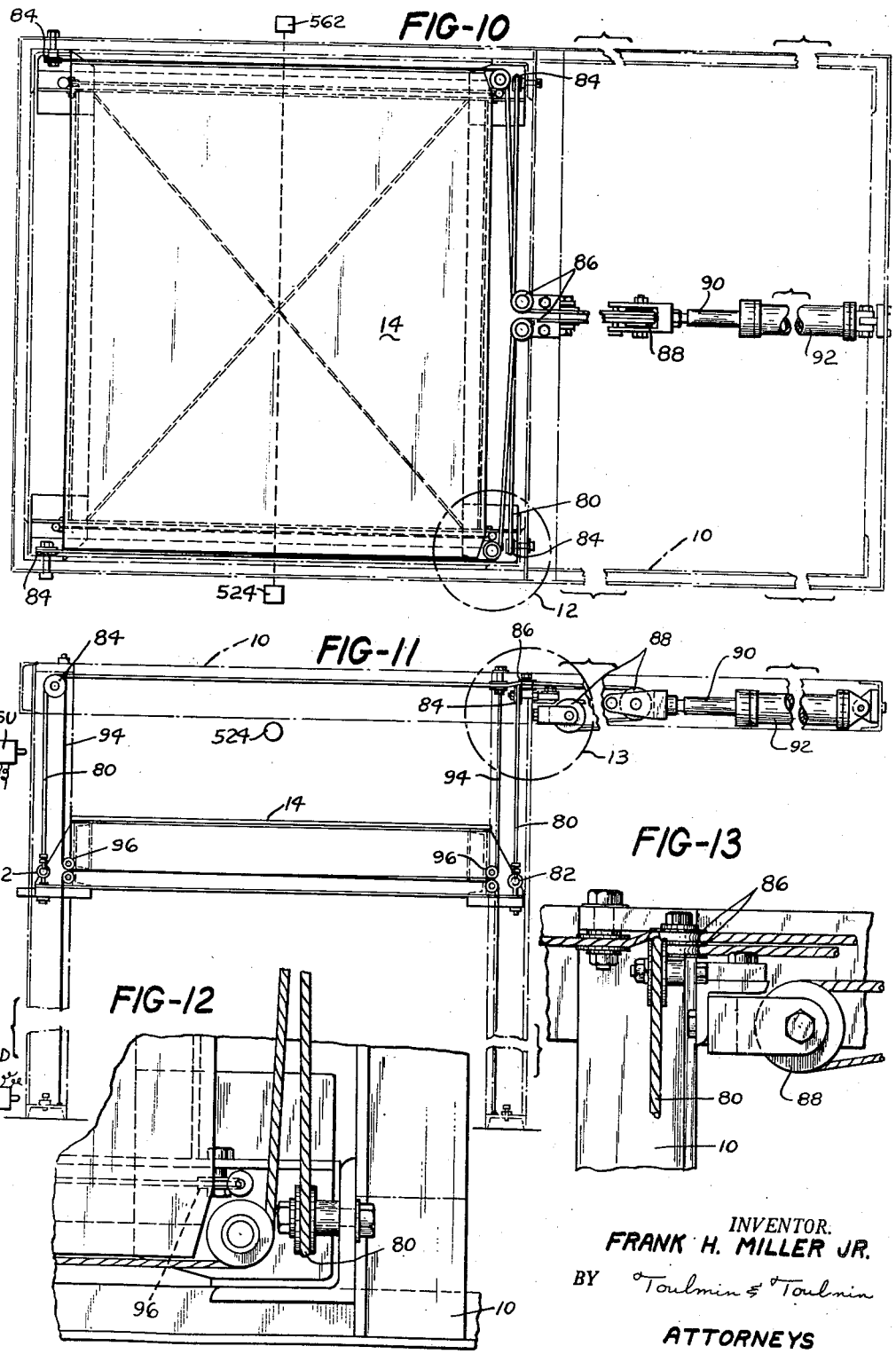

Nov. 19, 1957     F. H. MILLER, JR     2,813,638
PALLETIZER
Filed Oct. 5, 1954     9 Sheets-Sheet 5
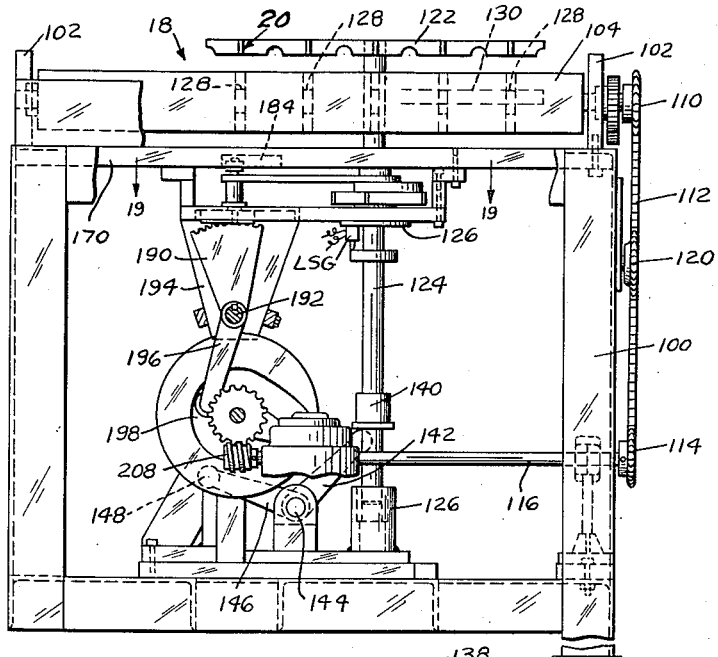
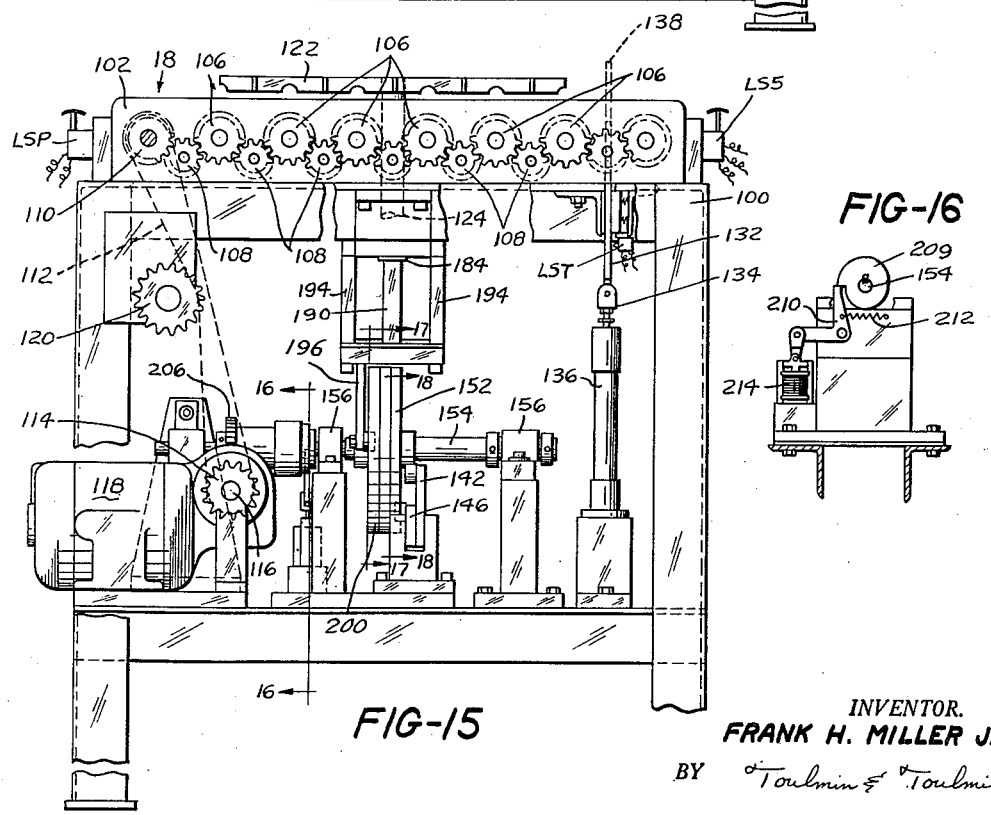
INVENTOR.
FRANK H. MILLER JR.
BY Toulmin & Toulmin
ATTORNEYS

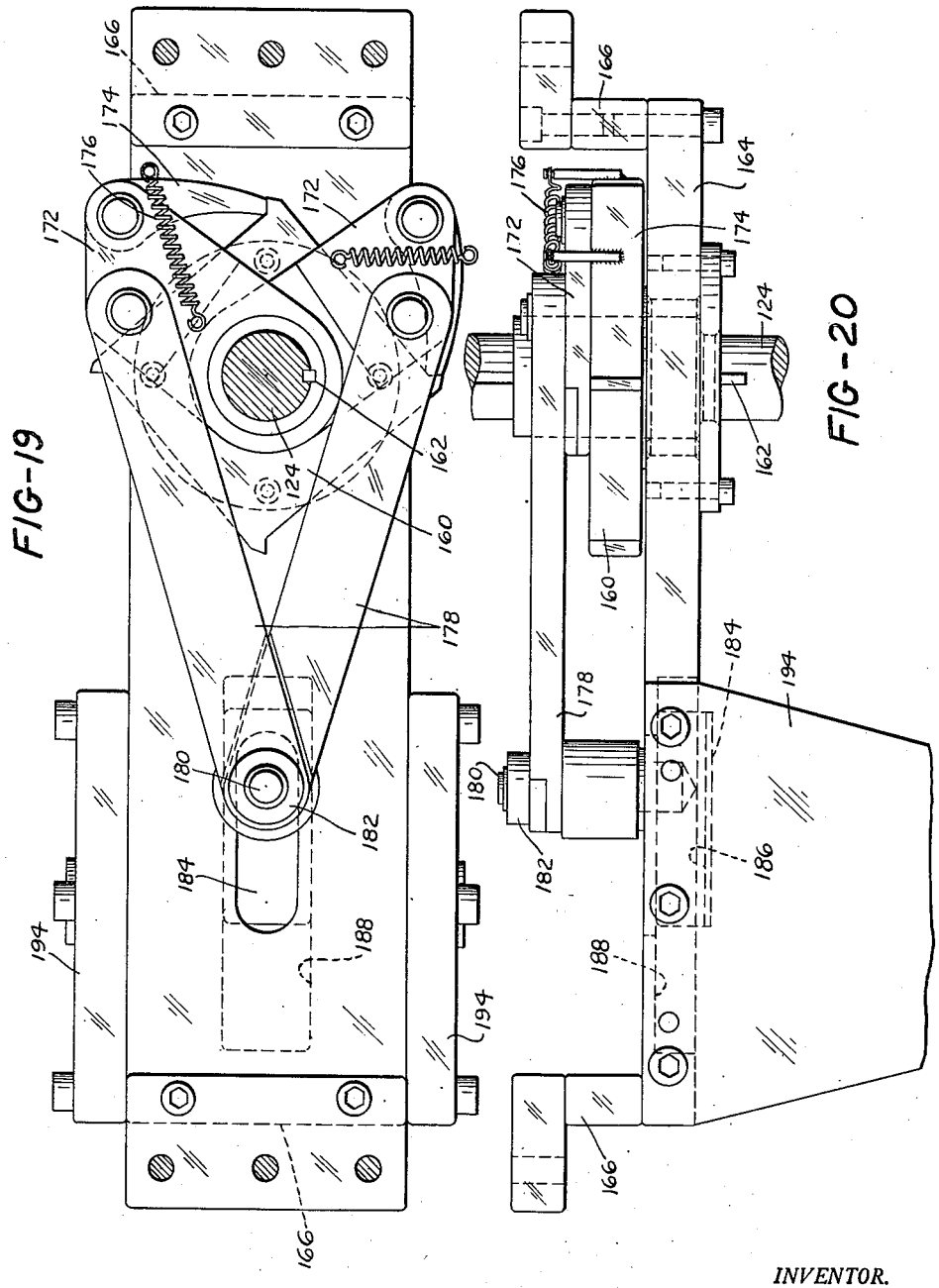

Nov. 19, 1957  F. H. MILLER, JR  2,813,638
PALLETIZER
Filed Oct. 5, 1954  9 Sheets-Sheet 7
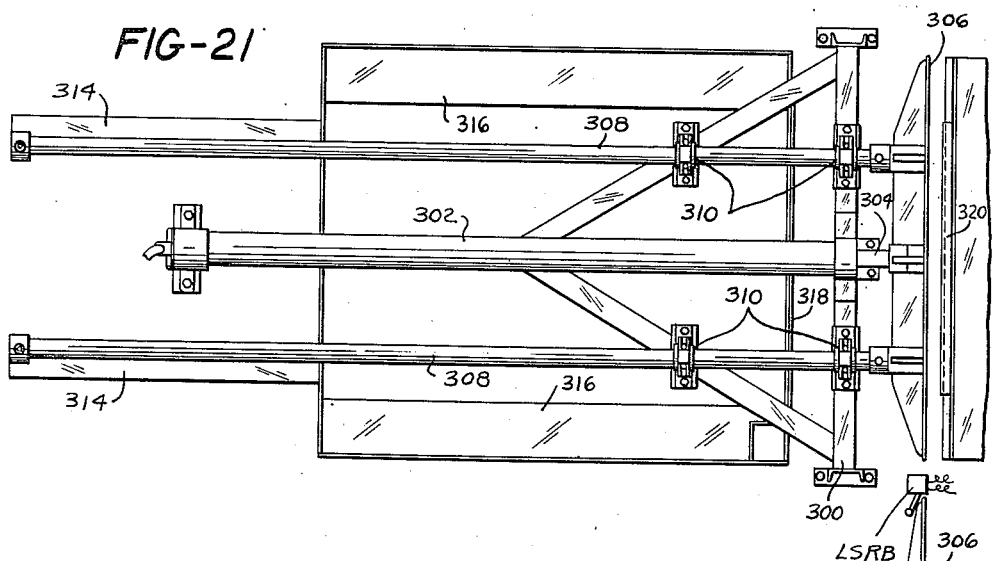
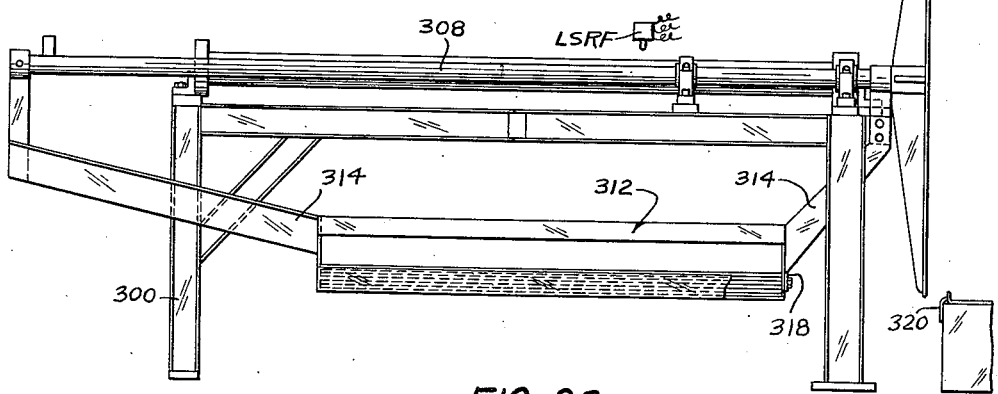
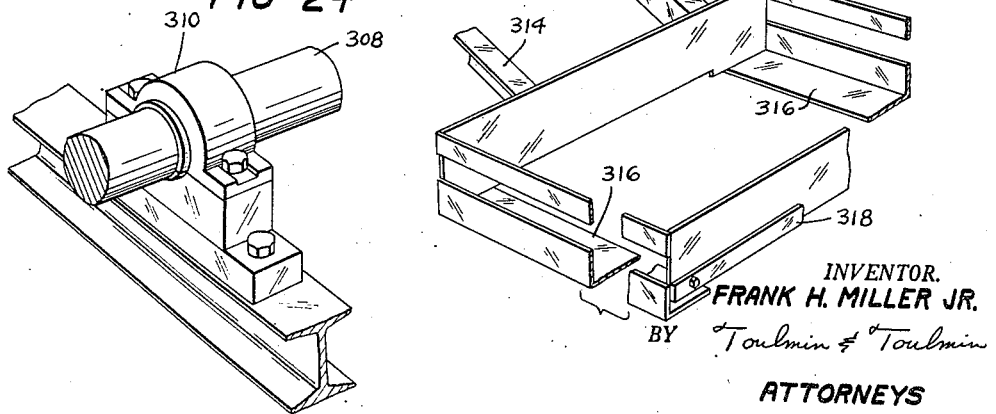
INVENTOR.
FRANK H. MILLER JR.
BY Toulmin & Toulmin
ATTORNEYS Nov. 19, 1957  F. H. MILLER, JR  2,813,638
PALLETIZER
Filed Oct. 5, 1954  9 Sheets-Sheet 8

INVENTOR.
FRANK H. MILLER JR.
BY Toulmin & Toulmin
ATTORNEYS

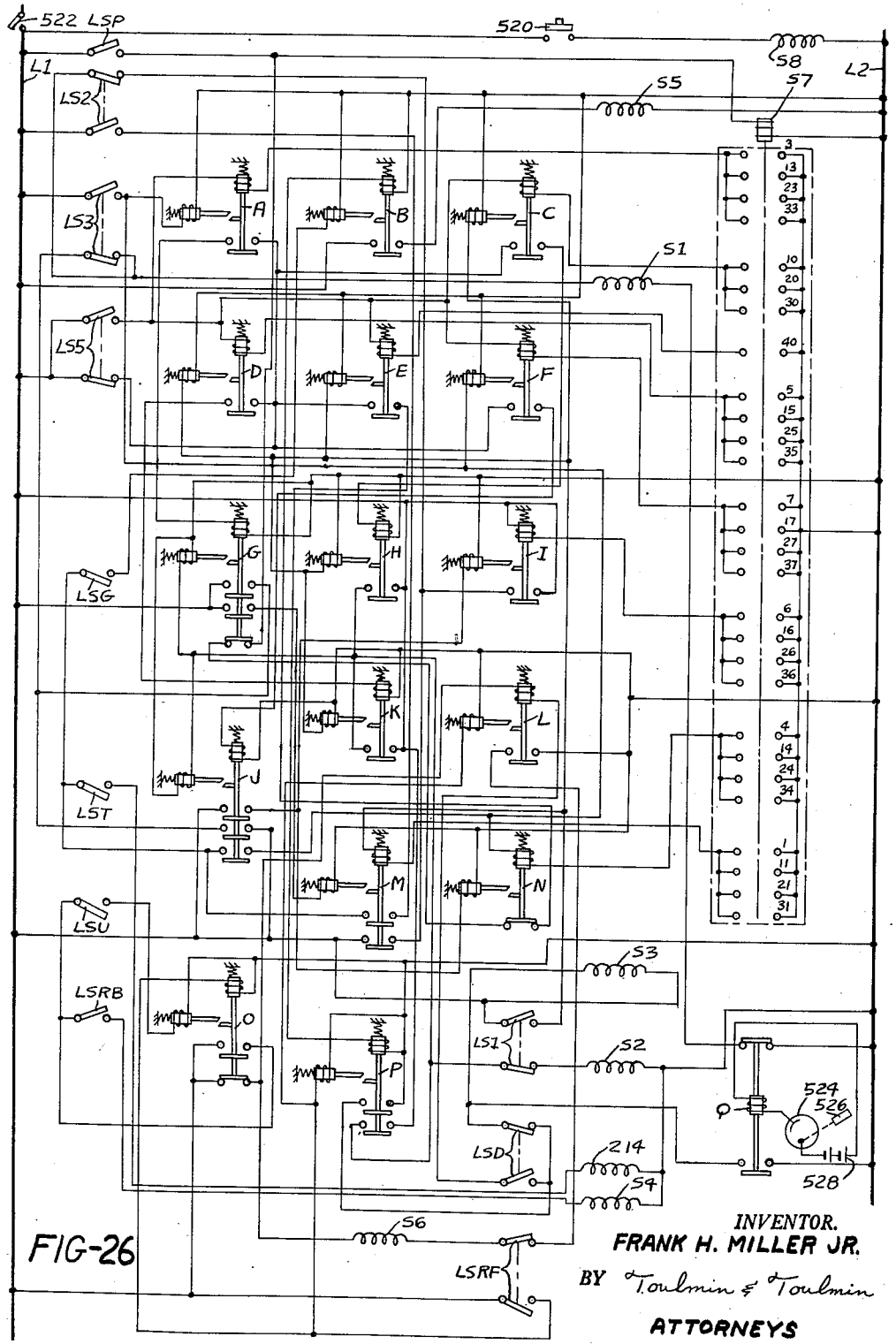

United States Patent Office 2,813,638
Patented Nov. 19, 1957

2,813,638

PALLETIZER

Frank H. Miller, Jr., Louisville, Ky., assignor to Miller Engineering Corporation, Louisville, Ky., a corporation of Kentucky Application October 5, 1954, Serial No. 460,482

8 Claims. (Cl. 214—6)

This invention relates to a palletizing device and to the method of operation thereof, and in particular to a palletizing device which is completely automatic in operation.

In the handling of many articles of commerce which are packaged in boxes and, more particularly, in bags, considerable expense is encountered in handling the packages between the time they are complete insofar as the filling and sealing thereof is concerned, and the time they are delivered to the final point of use.

This comes about because of the necessity, ordinarily, of moving and stacking of the boxes, cartons or bags into storage, onto trucks or box cars, or onto pallets manually.

Having the foregoing in mind, it is a primary object of the present invention to provide a mechanism adapted for effecting the automatic palletizing of articles, such as boxes, cartons or bags, that are adapted for being stacked in this manner for handling purposes.

A further object of the present invention is the provision of a device which will effect the palletizing of articles of the nature referred to in the form of a plurality of interlocked layers, thus making a stable and easily transported end product.

A still further object of the present invention is the provision of a device for palletizing articles of other than square configuration in the form of a plurality of overlapping interlocking layers.

Another object of the present invention is the provision of a device of the nature referred to to insure the articles being handled or arranged in layers on a pallet with the individual layers being adhesively secured together.

It is also an object of this invention to provide an improved control system, by means of which the palletizing device can readily be operated on a full automatic cycle by relatively unskilled persons.

Another particular object of the present invention is the provision of an arrangement for unloading the stacked articles from the device while simultaneously preparing the device for palletizing another load.

These and other objects and advantages of this invention will become more apparent upon reference to the following specification, taken in connection with the accompanying drawings, in which:

Figure 1 is a relatively diagrammatic perspective view showing a device according to the present invention with the load receiving elevator in its up position and the roll table to which the articles to be palletized are originally delivered being in its retracted position;

Figure 2 is a view similar to Figure 1 but showing the roll table advanced over the elevator platform and with one layer of articles deposited thereon;

Figure 3 is a view like Figure 2 but shows the elevator in a lowered position with several layers of articles thereon and with a layer of articles on the roll table arranged thereon according to the pattern which alternates with the pattern of articles shown in Figure 2;

Figure 4 is a fragmentary view showing how the roll table is adapted for being halted in a mid-position for receiving the lefthand row of articles as the first step in building up a layer of articles on the roll table;

Figure 5 is a view showing a loaded pallet being pushed out of the machine off the elevator platform;

Figure 6 is a diagrammatic perspective view showing two layers of a load as deposited according to this invention, with the upper layer being tilted upwardly to show the adhesive strips that are applied thereto as the load is transferred from the roll table to the elevator platform;

Figure 7 is a plan view looking down on top of the palletizing device according to this invention, with the roll table in its retracted or righthand position;

Figure 8 is a partial side elevational view showing the roll table and the stripper bar at the left end thereof, by means of which the load on the roll table is pushed off onto the elevator platform when the roll table is moved to the right;

Figure 9 is a view showing the roll table from the right end of Figure 7 showing the gears that drive the rolls and the idler gears therebetween and also showing a portion of the conveyor table by which the articles being palletized are delivered to the roll table;

Figure 10 is a plan view of the machine similar to Figure 7 but showing the elevator platform and the operating mechanism thereof, with the frame shown in phantom outline and with the roll table removed;

Figure 11 is a side elevational view of the elevator platform and the operating mechanism therefor;

Figure 12 is a fragmentary view showing the lower righthand corner of the elevator platform of Figure 10, the portion illustrated being indicated in the dotted circle marked 12;

Figure 13 is a fragmentary view showing that portion of Figure 11 enclosed by the dotted circle mark at 13 but drawn at increased scale;

Figure 14 is a view of the conveyor table as it appears looking upwardly from the bottom of Figure 7;

Figure 15 is another view of the conveyor table looking in from the right side of Figure 14;

Figure 16 is a sectional view indicated by line 16—16 on Figure 15 showing a single revolution clutch arrangement associated with the conveyor table for cooperation with an article-turning mechanism forming a part of the conveyor table;

Figure 17 is a sectional view indicated by line 17—17 on Figure 16 showing a cam forming a part of the actuating mechanism for the article-turning portion of the roll table;

Figure 18 is another sectional view indicated by line 18—18 on Figure 15 showing another cam, by means of which the mechanism that lifts the article to be turned is operated;

Figure 19 is a plan sectional view taken on line 19—19 of Figure 14 showing a ratchet drive device for rotating the article-turning platform or grid of the conveyor table;

Figure 20 is a side elevational view of the mechanism of Figure 19;

Figure 21 is a plan view looking down on top of a pusher device that operates to push palletized loads off the elevator platform and a pallet-carrying tray associated with the pusher;

Figure 22 is a side elevational view of the pusher device and pallet tray;

Figure 23 is a fragmentary perspective view showing a portion of the pallet tray;

Figure 24 is a perspective view showing a guide bearing through one of the guide rods for the pusher of Figures 21 and 22 passes;

Figure 26 is a diagrammatic representation of the electric control circuit for controlling the operation of the machine.

General arrangement

Figure 25:
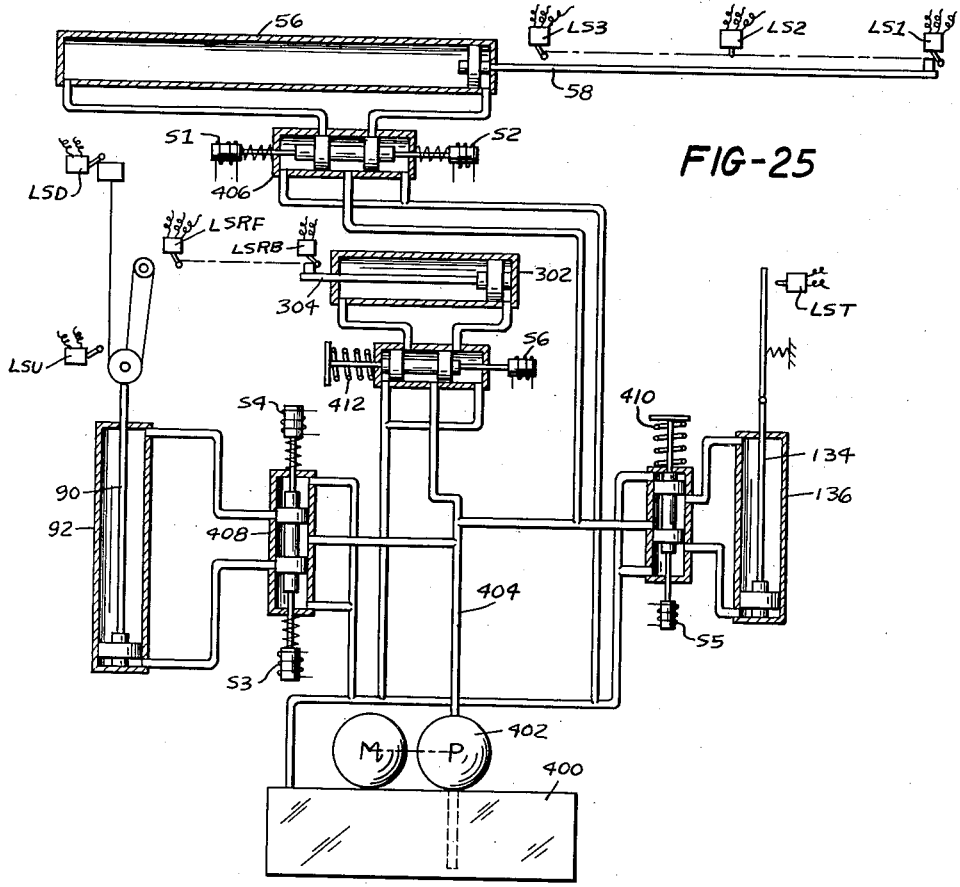
Figure 25 is a diagrammatic view showing the hydraulic operating circuit of the palletizing machine of this invention, by means of which the roll table, the elevator platform, the pusher, and a trimmer plate are controlled.

According to the present invention the mechanism which is provided for palletizing articles, such as boxes, cartons or bags, comprises a movable table to which the articles to be palletized are delivered into pallet rows, with the articles in one row turned at 90° to those in the other row. This pattern of articles is then transferred from the roll table to an elevator platform, and the elevator platform is then lowered and the roll table receives another layer of articles to be palletized, arranged thereon according to a second pattern, and which layer is then transferred to the elevator platform on top of the first layer.

In the transferring of each layer of articles from the roll table to the elevator strips of adhesive are applied thereto so that each layer will be adhered to the layer therebeneath, and the bottom layer on the elevator platform will be adhered to a pallet sheet supported thereon.

The pattern that the articles occupy on the roll table is determined by a turning mechanism associated with the conveyor on which the articles approach the roll table, which turning mechanism is controlled by a counting mechanism that includes a switch actuated by the approaching articles.

After the elevator platform has been completely loaded with as many layers as it is desired to place on the pallet sheet on the elevator platform, a pusher pushes the load from the elevator platform on the receiving table and simultaneously a new pallet sheet is deposited on the elevator platform.

The pusher is then retracted and the elevator platform is raised to receive a new load.

Automatic control means, including electrical and hydraulic circuit elements, are provided for making the operation of the device entirely automatic, with the primary control of the mechanism residing in the counter including the article actuated limit switch previously referred to.

Structural arrangement

Referring to the drawings somewhat more in detail, particularly to Figures 1 through 6, the machine of this invention comprises a supporting frame 10 on which is movably mounted a roll table 12, with the table 12 being movable between its Figures 1 and 2 positions by a fluid motor. An elevator platform 14 is provided which is vertically reciprocable in the machine frame, and a conveyor 16 is provided on which articles to be palletized can be delivered to roll table 12 when it is positioned in alignment with the conveyor.

A conveyor roll table 18 is interposed between the end of conveyor 16 and roll table 12, and includes a turning station 20 comprising a vertically movable support grid which is movable upwardly for lifting an article to be palletized, whereupon the grid can be rotated 90° thus turning an article on conveyor table 18.

Both tables 12 and 18 comprise continuously driven rollers so that articles delivered thereto will be driven across the tables until they meet an abutment or a previously delivered article.

After roll table 12 has received a layer of articles, as shown in Figure 2, the said table is moved rightwardly and a stripper station 22 which includes a stripper plate will strip the layer of articles thereon off the roll table and drop them onto elevator platform 14. During the movement of the layer of articles from the roll table to the elevator platform it passes over adhesive applicator stations 24 which include glue rolls that deposit strips of adhesive across the bottom of the layer so that it will adhere to a pallet sheet on the elevator platform or to a previously deposited layer of articles thereon.

In Figure 2 there is shown a layer of articles on the roll table according to a first pattern, which pattern consists of two rows of articles arranged with the articles in one row at right angles to those in the other row.

In Figure 3 there is shown a layer on the roll table according to a second pattern, which pattern is the mirror image of the pattern of Figure 2.

As each layer is supplied to the elevator platform the elevator platform is moved downwardly, and when it is fully loaded in its lowermost position a pusher station generally indicated at 26 is actuated inwardly to push the load from the elevator platform to a receiving platform 28.

In supplying the articles to roll table 12 the roll table is first moved from its Figure 1 position to an intermediate position, as illustrated in Figure 4, and in which position the roll table will receive the lefthand row of articles of the pattern being supplied thereto. When the first, or left hand row of articles has been deposited on the roll table, the roll table is then moved to its Figure 2 position and the second, or right hand row of articles is supplied thereto to make up a complete layer.

In Figure 6 there is shown a first layer of articles at 30, according to the pattern of Figure 2, and a second layer of articles at 32, according to the pattern of Figure 3. It will be noted that the layer 32 has had applied thereto the adhesive strips 34, by means of which it will be bonded to the layer 30 or to a supporting pallet sheet.

Roll table

The structure of the roll table, and its support on the frame of the machine, is more fully illustrated in Figures 7, 8 and 9.

In these figures it will be noted that the roll table 12 consists of a frame 40 carrying supporting rollers 42 at the opposite sides which ride on tracks 44 running along the upper edge of frame 10. Roll table frame 40 has mounted therein a plurality of rollers 46 which are connected for rotation in unison and in the same direction as by the gears 48 on the roller shafts, which are drivingly connected by the idler gears 50. The rollers 46 are adapted for continuous rotation by an electric drive motor 52 carried by frame 40 at one side and connected for driving the rolls by the gears 54.

On one side of frame 10 of the machine there is a hydraulic cylinder 56, within which there is a double-acting ram 58 connected with the frame 40 of the roll table and forming a hydraulic motor energizable for moving the roll table on frame 10.

At the left end of roll table 12 there is an inclined platform 60, beneath which there is located the adhesive applicator stations 24 which comprise a glue pot or adhesive trough 62 into which dip glue rollers 64 that project through slots 66 in inclined platform 60 so that articles pushed off the roll table and over platform 60 will have strips of adhesive applied thereto.

Immediately leftwardly of platform 60, as the roll table is positioned in Figures 7 and 8, there is the stripper station 20 comprising a stripper bar 68 which has its opposite ends guided in slot means in the upright brackets 70 carried on opposite sides of the machine frame 10.

At its lower edge at opposite ends thereof, stripper bar 68 carries the roller means 72 which ride on the side members of frame 40 of the roll table. These side members, as will best be seen in Figure 8, have the lefthand ends inclined downwardly so that, when the roll table 12 is moved leftwardly, stripper bar 68 will lift and permit the roll table to pass therebeneath. However, after articles have been deposited on the roll table and it is moved rightwardly, the stripper bar will hold the articles stationary while the table continues movement thereby stripping the articles from the roll table.

At one side of the roll table it carries a stationary stop bar 74 arranged parallel with the rollers 46 of the table, and providing an abutment against which articles delivered to the roll table will halt.

Elevator structure

The elevator mechanism, including the elevator platform 14 previously referred to, and the actuating mechanism therefor, will be seen in Figures 10 through 13.

In these figures it will be noted that the elevator platform 14 is located within frame 10, generally leftwardly of stripper plate 68. The elevator platform is vertically movable in the frame by cable means 80 attached to the four corners of the platform, as at 82, and leading over pulleys or rollers 84 distributed about within frame 10, then around pulleys or rollers 86 arranged in the center of the frame, and then passing about the pulleys 88, the lefthand set of which is fixed in the frame while the righthand set thereof is carried on the end of ram 90 that extends into hydraulic cylinder 92 supported within frame 10 of the machine, and the cable then being anchored to the said ram.

It will be apparent that the described cable arrangement provides for a three to one motion-increasing connection between ram 90 and the elevator so that movement of the ram a predetermined amount will bring about corresponding increased vertical movement of the elevator.

The elevator platform 14 is maintained substantially horizontal within the frame 10 of the machine at all times by the guide cable means 94, which have their opposite ends fixed to the top and bottom of the frame and each of which leads downwardly to the elevator platform, then laterally across one end of the platform, and then downwardly to the bottom of the frame, with rollers being provided at 96 to support the guide cables at the elevator platform.

In the manner described above an elevator platform is provided which will remain level at all times without the expense of guide-ways being formed in the machine frame and with the elevator being movable vertically within the frame at all times.

Conveyor table

The conveyor table 18 previously referred to is illustrated, together with the mechanism associated therewith, in Figures 14 through 20. The conveyor table, which is somewhat similar to roll table 12 in that it comprises driven rollers, has a frame 100 which is fixed in position relative to frame 10, as will be seen in Figure 7, so that articles delivered across the conveyor table 18 will pass to roll table 12 somewhat leftwardly of stripper plate 68.

Mounted in frame 100, at the top thereof between the side members 102, are a plurality of rollers 104 somewhat below the level of the tops of members 102 arranged for continuous rotation all in the same direction, by means of the gears 106 connected thereto, with the idlers 108 drivingly connecting the gears and with one of the rollers being provided with a sprocket 110 over which passes a chain 112 that also passes around a driven sprocket 114 on shaft 116 which is one end of the output shaft of the geared head electrical drive motor 118. An adjustable idler 120 is provided for maintaining the chain 112 taut.

Associated with conveyor table 18 is the aforementioned turning station 20 comprising a pickup grid 122 mounted on the upper end of the shaft 124 which is vertically reciprocable within the frame of the conveyor table and is guided therein at spaced points by the bearings 126. Grid 122 consists of a plurality of bars parallel with rollers 104 and a plurality of bars at right angles of the rollers 104 with the bars being rigidly interconnected.

The rollers located beneath grid 122 are grooved as at 128 so that when the grid is in its lower position, as indicated by the dotted fragmentary outline 130 in Figure 14, it is beneath the level of the rollers so that articles can be conveyed by the rollers directly over the grid. Elevating of the grid, however, when an article is positioned on the rollers thereover will serve to lift the article from the said rollers.

Between grid 122 and the main frame of the machine there is a trimmer plate 132 which is connected to the ram 134 that extends into a cylinder 136, the ram and cylinder forming a fluid motor for raising the plate 132 upwardly to the dotted position indicated at 138 where it will stop articles that are passing across the conveyor table. In its retracted position the upper edge of trimmer plate 132 is beneath the upper level of the rollers and articles will readily pass across the trimmer plate.

The aforementioned trimmer plate 132 and grid 122 are availed of for rotating selected ones of articles passing across the conveyor table to a position 90° from their normal position in order to obtain the patterns that were described in connection with Figures 2, 3 and 6.

In utilizing the trimmer plate and the grid for turning articles, means are provided for lifting the grid after the article has been stopped on the conveyor table by trimmer plate 132, then retracting the trimmer plate and rotating the grid through 90°, and then lowering the grid in its rotated position whereby the article will continue its advance across the conveyor table in its rotated position.

The mechanism for raising the grid 122 comprises a collar 140 on shaft 124 which is engaged by the end of an arm 142 of a bell crank lever that is pivoted at 144, and which has another arm 146 carrying a roller 148 that engages a cam groove 150 (Figure 18) in a cam 152 fixed to a shaft 154 that is rotatably supported by bearings 156 in frame 100. Groove 150 of cam 152 is so arranged that grid 122 will be completely lifted in about 90° of rotation of the cam from its Figure 18 or normal position, and will thereafter remain elevated during a further 180° of rotation of the cam and then, during the final 90° of rotation of the cam, the grid will be returned to its lower position. During the period that the grid 122 is in its elevated position the grid and its supporting shaft 124 are rotated 90° by a ratchet drive arrangement, as illustrated in Figures 19 and 20.

Figures 19 and 20 show a ratchet plate 160 which is keyed to shaft 124 as by key 162. Ratchet plate 160 is journalled in a support plate 164 which is suspended from spaced bracket means 166 which are fixed to a transverse bar 170 in frame 100. Rotatable relative to ratchet plate 160 on the shaft 124 are two arms 172, each of which carries a pawl 174 that is spring urged by spring 176 against the periphery of ratchet plate 160. Each of arms 172 has pivotally connected thereto a link 178. The ends of the links 178, opposite their connection with the arms 172, are pivoted to a vertical stud 180. Stud 180 forms a portion of a reciprocating assembly that includes a guide portion 182 at the upper end that is guided in a slot 184 in bar 170, and a rack portion 186 at the lower end that is slidable in a groove 188 formed in the underside of support plate 164. The arrangement is such that reciprocation of stud 180, first rightwardly and then leftwardly, will bring about 90° rotation of ratchet plate 160, shaft 124 keyed thereto, and grid 122 mounted on the said shaft.

The stud 18 is reciprocated in the described manner by means of a gear sector 190 which meshes with rack 186. Gear sector 190 is mounted on shaft 192 that is carried by a pair of plates 194 that depend from the opposite sides of support plate 164. Also connected with shaft 192 is an arm 196 having roller means 198 on the end thereof that engages a cam track 200 in a cam 202 (Figure 17).

Cam 202 is mounted on shaft 154 which also carries cam 152 so that the two said cams rotate together. The cam track 200 is such that upon rotation of cam 202, from its Figure 17 or normal position, the arm 196 will remain stationary for about 90° of cam rotation, and then swing first in one direction during a further 90° of rotation of the cam, and then in the opposite direction during the next 90° of rotation of the cam and back to its original position, and then remain stationary during the final 90° rotation of the cam.

During the aforementioned swinging movements of the arm 196 the stud 180 is reciprocated so as to impart exactly 90° of rotation to shaft 124 and grid 122. It will be observed, from Figures 17 and 18, that the rotation of the said shaft and grid will take place during the interval that the shaft and grid are in their elevated position, and that during raising and lowering movements of the grid and shaft no rotation is imparted thereto.

Shaft 154 is connected through friction clutch means 204 with a gear 206 that is driven by a worm 208 on the end of output shaft 116 of drive motor 118 opposite sprocket 114.

For holding shaft 154 in its normal Figures 17 and 18 position, and for permitting one single revolution thereof when the grid is to be elevated and rotated, there is provided a plate 209 fixed to shaft 154 and having a shoulder thereon adapted for being engaged by the stop lever 210. Stop lever 210 is normally held against plate 209 by spring 212, but can be disengaged from the plate by energization of a solenoid 214.

*Pushoff ram assembly*

Figures 21 through 24 illustrate the pusher station 26, including a tray in which pallet sheets are placed for being automatically deposited on the elevator platform.

In Figures 21 and 22 it will be noted that there is a frame 300 that supports a hydraulic cylinder 302 in which is a double-acting ram 304 to which is connected a substantially flat pushoff plate 306. Guide rods 308 attached to the back of the plate 306 extend rearwardly through the bearing blocks 310 and serve to retain the plate 306 in a plane normal to ram 304.

Rods 308 are also availed of for supporting a pallet tray 312, by means of the bracket members 314 at opposite ends of the tray which are connected with the said rods. The tray 312 consists of side, front, and back members interconnected to form a box-like frame and having bottom members 316 extending inwardly from opposite sides of the box frame to provide support for the side edges of pallet sheets or cardboards stacked in the tray.

The front wall of the tray consists of a transverse adjustable plate member 318 which is arranged so as to expose the front edge of the bottom pallet sheet in the tray. This arrangement is availed of for automatically delivering pallet sheets to the elevator platform simultaneously with the unloading of a load from the elevator platform by means of the hook member 320.

Hook member 320 is positioned so that when the pushoff ram is in its furthermost advanced position the said hook member will engage the left edge of the lowermost pallet sheet so that when the ram is then retracted this pallet sheet will be stripped from the bottom of the stack of sheets in the tray and remain on the elevator 14 for receiving the next load of articles palletized by the device.

*Hydraulic circuit*

Figure 25 shows diagrammatically the hydraulic operating circuit for the machine. In Figure 25 a source of fluid 400 is connected with a pump 402 that delivers pressure fluid to pressure manifold 404 leading to the inlet ports of the valves associated with the several motors previously referred to.

The roll table motor has connected therewith the closed center normally centered four-way reversing valve 406, with which is associated an operating solenoid S1 energizable for causing ram 58 to move leftwardly and a solenoid S2 energizable for causing ram 58 to move rightwardly, with deenergization of both solenoids permitting centering of the valve and halting of the ram.

The elevator motor, consisting of cylinder 92 and ram 90, has a similarly closed center normally centered four-way reversing valve 408, which includes a solenoid S3 energizable for causing ram 90 to move leftwardly and solenoid S4 energizable for causing ram 90 to move rightwardly, and de-energization of both solenoids centering the valve and halting ram 90.

The trimmer plate motor, consisting of cylinder 136 and ram 134, has a four-way reversing valve connected therewith normally biased by spring 410 into position to retract ram 134 downwardly, and comprising a solenoid S5 energizable for causing ram 134 to move upwardly.

The motor for the pushoff plate, which consists of cylinder 302 and ram 304, has connected therewith a four-way reversing valve normally biased by a spring 412 into position to cause ram 304 to retract leftwardly and including a solenoid S6 energizable for shifting the valve to cause ram 304 to advance rightwardly.

*Electric control circuit*

Figure 27:
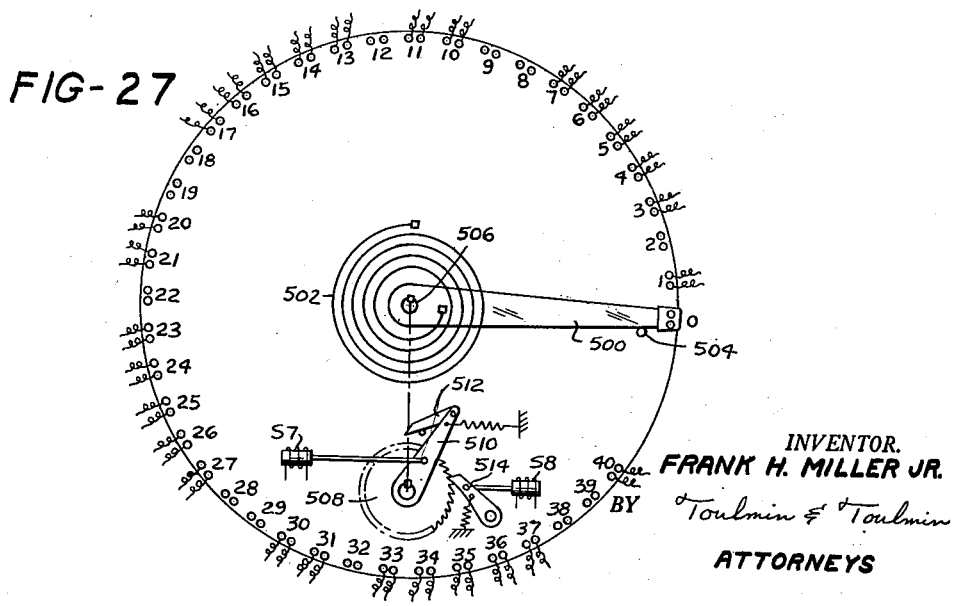
Figure 27 is a diagrammatic illustration of a typical step-switch arrangement forming a part of the electric circuit of Figure 26.

Figure 26 shows the electric control circuit of the machine, while Figure 27 illustrates diagrammatically a stepping switch forming a part of the electric control circuit.

Referring first to the stepping switch arrangement, this consists of a series of pairs of contacts numbered from 0 to 40, and a contact arm 500 biased by a spring 502 in a clockwise direction so that it normally rests against stop pin 504 in position to rest on the first pair of contacts which, in this case, are idle.

Switch arm 500 is mounted on a shaft 506, on which is also mounted a ratchet wheel 508 having teeth spaced at the same angularity as the spacing between the pairs of contacts on the switch.

An arm 510 rotatable on shaft 506 carries a pawl 512 normally disengaged from the periphery of ratchet wheel 508, but engageable therewith upon the energization of solenoid S7 for indexing the ratchet wheel one step in a counter-clockwise direction.

A stationarily mounted detent pawl 514 engages the ratchet wheel in each indexed position thereof to retain the ratchet wheel and switch arm in said indexed position, but is releasable from the wheel by the energization of solenoid S8 in order to permit spring 502 to return the switch arm to its starting position when the switch is to be reset.

It will be apparent that swtich S7 is a stepping switch in which the contact arm 500 will successively step from whichever pair of contacts it is bridging to the next upon an electrical impulse being delivered to solenoid S7, with the switch being resettable by delivering an impulse to solenoid S8.

In the electric circuit of Figure 26 there is shown a plurality of latching-type relays, indicated by capital letters from A to P, a photo relay Q, the previously identified operating solenoids 214 and S1 to S8, together with limit switches indicated at LSP, LS1, LS2, LS3, LS5, LSG, LST, LSU, LSRB, LSRF, a reset switch 520, and an on-and-off switch 522 connected between power lines L1 and L2, with the circuit including the previously described stepping switch, of which only the active ones of the numbered contact pairs and the controlling solenoids S7 and S8 are illustrated.

Referring first to photo relay Q, this comprises a contactor having a normally closed blade and a normally open blade under the control of an energizing circuit consisting of photo cell 524, light source 526, and energy source 528 connected in circuit so that the operating solenoid of relay Q is energized when the cell is dark and is de-energized when the cell is illuminated.

The location of the photo cell and light source is shown at Figures 10 and 11, wherein it will be seen that they are arranged on respectively opposite sides of the elevator platform 14, and at such a level that when the elevator platform is at a height that the cell is illuminated the elevator platform, or the load thereon, will be just below the bottom of the roller table 12 so that the table can freely reciprocate over the elevator while loads stripped from the roll table will have only a short distance to drop before being received on the elevator.

Limit switch LSP is a normally open limit switch positioned, as indicated in Figures 7 and 15, so as to be engaged and closed by each article to be palletized that moves onto the conveyor table. Closure of switch LSP supplies an impulse to solenoid S7 which causes the stepping switch previously referred to to move from whichever position it occupies to the next position.

Limit switch LS2 is a limit switch controlled by movement of the roller table and consists of one normally closed blade in circuit with solenoid S1 and a normally open blade in circuit with the closing coil of relay B. Switch LS2 is positioned to be engaged and actuated so as to open the normally closed blade thereof while closing the normally open blade by cam means 501 on the roll table at about the mid-point of its leftward movement, as illustrated in Figure 8.

Limit switch LS3 comprises a normally open blade in circuit with the unlatching coil of relay A and a normally closed blade in circuit with table solenoid S1. Switch LS3 is adapted for being actuated as the table reaches its extreme left end position, as is illustrated in Figure 7, to close the normally open blade thereof while opening the normally closed blade.

Limit switch LS5 consists of a normally open blade in circuit with the closing coils of relays A, C, D, E and F, and a normally closed blade in circuit with the closing coils of relays G, H, J, K and P through respectively the closed contacts of A, C, F, D and E. Switch LS5 is positioned to be engaged and actuated by bags passing onto the roll table 12, as illustrated in Figure 7. Switch LS5 thus has its normally open blade closed as each article passes to the roll table, and after the article has passed the switch its normally closed blade again closes.

Limit switch LSG is a normally open limit switch in circuit with the unlatching coil of relay B, and is adapted for being closed by upward movement of the turner grid 122 and its supporting shaft 124, as illustrated in Figures 14, 17 and 18.

Limit switch LST is connected in circuit with the clutch solenoid 214 and is adapted for being closed by the trimmer plate 132 when in its upper position, and pressed toward the right by an article thrust thereagainst by the feed rollers.

Limit switch LSU is a normally open limit switch in circuit with the unlatching coil of relay O and is adapted for being closed by the elevator when the latter reaches its uppermost position, as illustrated in Figure 11.

Limit switch LSRB is normally open and is connected in circuit with the solenoid S4, which causes upward movement of the elevator when energized. Switch LSRB is adapted for being closed when the pushoff ram is in its fully retracted position, as illustrated in Figure 22.

Limit switch LS1 is also controlled by the table and includes a normally open blade in circuit with the closing coil of relay M and with the unlatching coils of relays C, D, E, H and K. This limit switch also includes a normally closed blade in circuit with solenoid S2 for moving the table rightwardly. Switch LS1 is adapted for being actuated when the table reaches its extreme righthand position, as illustrated in Figure 8, to open the normally closed blade thereof while closing the normally open blade.

Limit switch LSD is controlled by the elevator and includes a normally closed blade in circuit with solenoid S3 energizable for moving the elevator downwardly, and includes also a normally open blade in circuit with the closing coil in relay L. This switch is adapted for being actuated when the elevator reaches its lowermost position, as illustrated in Figure 11, to close the normally open blade thereof while opening the normally closed blade.

Limit switch LSRF is controlled by the push-off ram and includes a normally closed blade in circuit with solenoid S6 energizable for causing the pusher ram to move forwardly, and also includes a normally open blade in circuit with the closing coil of relay O, and with the unlatching coils of relays L and P. This switch is actuated when the pushoff ram reaches its forward position.

The stepping switch is illustrated in Figure 26 insofar as the active contacts thereof are concerned, and these are illustrated with one contact with each pair connected with line L2 and the other contact of the pairs divided into groups; one group being connected in circuit with closing coil of relay A; another group in circuit with the closing coil of relay C; a single contact connected with closing coil of relay E; another group connected in circuit with closing coil of relay D; another group connected in circuit with closing coil relay F; another group connected in circuit with closing coil of relay I; another group connected in circuit with closing coil of relay N; and the last group thereof being connected in circuit with the closing coil of relay M.

*Operation*

In operation, let it be assumed that the stepping switch is at its starting position, and that the roll table 12 is at its extreme righthand position.

Under these circumstances, an article received on table 18 will actuate limit switch LSP, and this will deliver an impulse to solenoid S7 of the stepping switch and advance the switch arm thereof to its first position. Closing of limit switch LSP will also establish a circuit through the closing coil of relay B via the normally closed blades of relays N and G, thus closing relay B and energizing trimmer solenoid S5. Energization of solenoid S5 will cause trimmer plate 132 to move upwardly into position to stop the article that is advancing against table 18, and when the stop plate in its uppermost position is engaged by the article being delivered across the table it will engage and close limit switch LST.

When the stepping switch reaches the contacts in the number one position a circuit will be established through the closing coil of relay M via the normally open blade of limit switch LS1, which blade is held closed by the table in its extreme right-hand position. Closing of relay M will complete a circuit through solenoid S1 that causes the table to move leftwardly through the normally closed blade on limit switch LS2 and a blade on relay M referred to above. This will cause leftward movement of the roll table 12 to about its mid position, at which time it will engage limit switch LS2 opening the normally closed blade thereof and closing the normally open blade thereof.

Closure of limit switch LST, previously referred to, completes a circuit through clutch solenoid 214, a blade on now closed relay M, and the normally open blade on switch LS2 which is now closed.

Energization of clutch solenoid 214 will release shaft 154, and in the manner previously described this will cause lifting of the turning grid 122 to lift the article, which is now resting against stop plate 132, whereupon the grid is rotated 90°, and then lowers to deposit the article in its turned position on the rollers of table 18.

As the grid 122 approches its uppermost position limit switch LSG is engaged and closed, and this completes an energizing circuit through the unlatching coil of relay B, through a blade on closed relay M, and the now closed normally open blade of limit switch LS2. Unlatching of relay B de-energizes the trimmer solenoid S5 so that, while the article is turning with grid 122, the trimmer plate retracts so that the article when set down on the table will then advance therefrom to roll table 12 which, as mentioned previously, is straight in its intermediate position. The rollers on roll table being continuously rotating, the article delivered thereto is carried across the roll table until it is halted by stop plate 74.

In passing from the stationary table 18 to the roll-table 12 the article actuates limit switch LS5 to close the normally open blade thereof, and then, after the article has passed on to the roll table, to permit the normally closed blade of this limit switch to again close.

Closing of the normally open blade of limit switch LS5 at this time is without effect because each of the relay coils under the control of this blade are also under the control of a contact pair on the stepping switch, which are not as yet bridged by the contact arm. Similarly, closing of the normally closed blade of limit switch LS5, after the article has passed on to the roll table, is without effect on the control circuit.

The foregoing steps, with the exception of the initial energization of relay M, are then repeated for two more articles, with the third article moving the stepping switch to its third indexed position, and in which position it bridges the contact pair marked 3.

With contact pair 3 now bridged, when the third article being handled passes across limit switch LS5 it will energize the closing coil of relay A, and when the article releases limit switch LS5 a closed blade on relay A establishes a circuit through the closing coil of relay G. Relay G, as mentioned before, has a normally closed blade in the energizing circuit for the closing coil of relay B and, thus, when the fourth article engages the pulsing switch LSP, relay B will not be closed and the trimmer plate 132 will not be lifted. Accordingly, the fourth article will be delivered straight across the stationary table 18 without turning.

Closing of relay G will also close a blade thereof that is also in circuit with the normally closed blade of limit switch LS3 and the solenoid S1, which will cause leftward movement of the roll table. Thus, the roll table 12 again shifts to the left until it reaches its extreme lefthand position, at which time it will open the normally closed blade of limit switch LS3 thereby halting the table, and it will also close the normally open blade thereof.

The fourth article, which is delivered straight across table 12 as mentioned above, will thus be received on the roll table in the second row. This fourth article, in passing across the pulsing switch, also causes the stepping switch to move to the position marked 4, and this establishes a circuit through the closing coil of relay N and the blade of limit switch LS3 which is closed when the table is in its extreme lefthand position. Closing of relay N opens the normally closed blade thereof that is in circuit with relay B pertaining to the trimmer plate.

The stepping switch has again reached a position where none of the contact pairs thereof in the circuits controlled by limit switch LS5 are closed, and the fourth article will, therefore, pass across limit switch LS5 without changing the circuit.

The fifth article passing across pulsing switch LSP will move the stepping switch to bridge contacts 5 thereof, but the control circuit is otherwise unchanged and this fifth article will, therefore, pass straight across stationary table 18 and be received in the second row of articles on roll table 12, thus completing the first layer to be built up thereon.

In passing over limit switch LS5, however, since the contact pair 5 is now bridged by the stepping switch, the fifth article will cause energization of the closing coil of relay D, and when the article passes beyond limit switch LS5 a now closed blade on relay D will cause energization of the closing coil of relay K. Closing of relay K will establish an energizing circuit through the normally closed blade of limit switch LS1, and the solenoid S2, which causes movement of the roll table to the right. Closing of relay K will also energize the unlatching coil of relay G, but this does not at this time modify the electric control circuit.

When the solenoid S2 is energized the roll table moves to the right and the stripper plate or bar 68 will strip the articles from the roll table and transfer them to the elevator platform 14. A pallet sheet has previously been deposited on the elevator platform, and the layer of articles stripped from the roll table will drop directly thereon. In passing down the incline 60, at the left edge of the roll table, the layer of articles has a plurality of strips of adhesive applied thereto by the adhesive applicator rolls 64. This will cause the layer to adhere to the pallet sheet.

When the layer of articles is dropped onto the elevator platform, as described, the light beam illuminating photo cell 524 is interrupted, and this will actuate the photo relay Q into position to open a blade which is in series with the table left solenoid S1, and to close a blade which is in series with the elevator down solenoid S3. Under these circumstances the table 12 remains in its righthand position, while the elevator moves downwardly until the said light beam is re-established, at which time the elevator halts and the circuit to table left solenoid S1 is again re-established.

The sixth article moving onto stationary table 18, and closing pulsing switch LSP, will move the stepping switch to position number 6 thereof, thus energizing the closing coil of relay I. Closing of the pulsing switch at this time does not cause operation of the turning mechanism because relay M is still closed, thus opening the circuit to relay B. Closing of relay I, however, completes the energizing circuit for table left solenoid S1 through the normally closed blade of limit switch LS2, and the roll table 12, as before, will move to its intermediate position and halt when it engages limit switch LS2. The sixth article is thus delivered to the first position in the first row of the second layer being built on roll table 12.

The seventh article passing onto stationary table 18 and engaging pulsing switch LSP causes the stepping switch to move to position 7 thereof, but otherwise does not modify the control circuit so that this article also passes straight across the stationary table to the roll table.

When the seventh article engages limit switch LS5 it will energize the closing coil of relay F and then, when the articles pass beyond limit switch LS5, the now closed blade of relay F will energize the closing coil of relay J. Closing of relay J establishes a circuit through the unlatching coil of relay I and also a circuit through the unlatching coil of relay N.

With relay N now open, relay G having been previously open, a circuit is now established for the energization of relay B when the next article strikes pulsing switch LSP.

Closing of relay J also establishes a circuit through the normally closed blade of limit switch LS3 and the solenoid S1 so that the table moves, as previously described, leftwardly until it engages limit switch LS3.

The eighth article that passes onto stationary table 18 and strikes the pulsing switch LSP will thus make the turning mechanism effective via relay B so that article 8 will be delivered as the first article of the second row of the second layer in a turned position. Since the stepping switch positions 8 and 9 are without contacts these articles will be delivered to table 12 in a turned position without changes in the electric control circuit.

When the tenth article passes onto stationary table 18, however, it will move the stepping switch to bridge the contacts in position 10 thereof, and when article 10 then passes across limit switch LS5 there will be established energizing circuits for the closing coils of relays C and H.

Closing of relay H will energize the unlatching coils of relays G and J and will complete a circuit through the normally closed blade of limit switch LS1 and the table right solenoid S2 so that the roll table 12, as before, will move to its extreme right hand position, stripping the second layer therefrom and dropping it on top of the layer previously deposited on the elevator platform, and also, as before, applying strips of adhesive to the underside of the second layer.

It will be evident from the foregoing that each layer is the mirror image of the preceding layer. With articles that are no longer than they are wide, such as cement bags and the like, the layers will be interlocked, while interlocking will be augmented by an adhesive connection between the layers.

With the delivery of the tenth article to the roll table, a basic cycle has been completed and, thereafter, the cycle will repeat until as many complete interlocking layers as is desired have been built up on the elevator platform. In the particular arrangement illustrated this consists of eight layers, a total of forty articles in all. The cycle is completed with the fortieth article being delivered and this fortieth article, when passing across pulsing switch LSP, will move the stepping switch to contact position marked 40. The fortieth article then, in passing across limit switch LS5, will energize the closing coil of relay E which, upon closing, will establish an energizing circuit for the closing coil of relay P that will be completed when article 40 releases limit switch LS5.

Closing of relay P will, as before, cause the table to move to the right to strip the last layer therefrom and to drop it onto the elevator platform. However, closing of relay P will also establish an energizing circuit from the elevator down solenoid S3 through the normally closed blade of limit switch LSD so that the elevator will move down to its lowermost position. When the elevator reaches its lowermost position the normally closed blade of limit switch LSD will be open and the normally open blade thereof will be closed, thus establishing an energizing circuit for the closing coil of relay L through the normally closed blade of limit switch LSRB and a blade of the now closed relay P.

Closing of relay L will energize the ram forward solenoid S6 through the normally closed blade of the ram forward limit switch LSRF. The complete load on the elevator is thus pushed therefrom onto a receiving table, or lift truck, or the like by the advance of the pusher plate 306. When the pusher reaches its furthermost advanced position it engages limit switch LSRF which de-energizes solenoid S6, and which also establishes energizing circuits for the closing coil of relay O and for the unlatching coils of relays L and P.

The pusher mechanism now retracts, depositing a new pallet sheet on the elevator platform, and in its fully retracted position again engages limit switch LSRB. At this time the closing of the normally closed blade of limit switch LSRB does not close relay L because of the now open blade of relay P in series therewith. Closing of this limit switch, however, does establish a circuit through the elevator up solenoid S4 so that the elevator now moves upwardly to the top of its stroke so that it will engage and close limit switch LSU that will energize the unlatching solenoid of relay O which will drop out and open the circuit to the elevator up solenoid S4, whereupon the elevator will halt.

The entire circuit and the parts of the palletizing device have now been restored to their original position, with the exception of the stepping switch, which switch can be reset, either manually or automatically, merely by closing switch 520 associated with solenoid S8 at the proper time.

From the foregoing it will be seen that this invention provides for a completely automatic palletizing device characterized in that the articles to be palletized are delivered in both straight through and turned relation, with the articles being received in rows laid side by side to make up layers.

The articles in each row are arranged at right angles to those in the next adjacent row, and the articles in each row are also arranged at right angles to those in the row directly therebeneath in the finished load.

It will be apparent that, while there is shown the building up of a load of eight layers, with five articles in each layer, distributed into rows, more or fewer layers could comprise a complete load and there could be a greater number of articles in each row and a greater number of rows in each layer, if desired, so long as the characteristic interlocking of the layers in the described manner took place.

It will also be apparent that the specific feeding means, namely, rollers, could be modified within the scope of the present invention, and that the transferring of each layer of articles from the roll table 12 to the elevator platform could be accomplished by a pusher member moving across the roll table rather than the roll table moving beneath a pusher plate, if so desired.

It will be understood that this invention is susceptible to modification in order to adapt it to different usages and conditions and, accordingly, it is desired to comprehend such modifications within this invention as may fall within the scope of the appended clams.

I claim:

1. In a palletizing machine; a frame, an elevator platform vertically movable in said frame, a receiving table reciprocable in the frame above the platform, a stripper bar in the frame immediately above the receiving table over one side of the platform, a conveyor table at the side of said receiving table adjacent the stripper bar on the elevator platform side thereof, said conveyor table including means to continuously feed elongate articles straight across to said receiving table or to turn the articles 90° while feeding them to the receiving table in front of said stripper bar, means responsive to the passage of articles to the table to shift the receiving table when a row is built up thereon in a direction to move the row away from the stripper bar to permit another row to be built up in front of the bar, and means for shifting the table in the opposite direction beneath the stripper bar when a predetermined number of rows are built up on the table to cause the layer of articles to be stripped from the table and drop to the elevator platform, said receiving table including a stop bar on the side opposite said conveyor table and means to urge articles supplied thereto toward said bar, said receiving table having an inclined ramp over which the layer of articles passes when being stripped from the receiving table, said ramp having an adhesive trough therebeneath and rollers dipping into the adhesive in the trough and projecting through the ramp to apply strips of adhesive to the bottom of each layer stripped from the receiving table.

2. In combination in a palletizer; an elevator platform adapted for receiving a palletized load and having a lowermost position, a pusher plate to one side of the platform movable for pushing the said load off the platform, and a pallet tray carried behind said plate so as to be over the platform in the advanced position of said plate adapted for carrying a plurality of pallet sheets, said tray having a horizontal slot in the bottom and a transverse opening in the front that exposes the front edge of the lowermost pallet sheet in the tray, and a stationarily mounted blade adapted to engage the rear edge of the said lowermost pallet sheet when the plate is advanced located in the path of said slot whereby retraction of the plate will cause a pallet sheet to be deposited on the platform.

3. A palletizing machine according to claim 1 in which the said receiving table comprises a plurality of elongated continuously rotating rollers mounted on parallel axes extending at right angles to the direction of delivery of articles from said conveyor table whereby the rollers move the articles against the stop plate and also provide a surface from which a layer of articles can readily be stripped by moving them lengthwise of said rollers.

4. A palletizing machine according to claim 1 in which the said stripper bar is vertically movable on the frame, and said receiving table comprises side rolls extending therealong and having inclined end parts parallel with and at the sides of said ramp, said stripper bar having rollers resting on the rolls for supporting the stripper bar thereon whereby the stripper bar follows the load being stripped from the receiving table as it moves down said ramp.

5. A palletizing machine according to claim 1 in which the said adhesive rollers are so spaced as to apply at least two strips of adhesive to each article in the layer stripped from the receiving table.

6. A palletizing machine according to claim 1 in which control means is provided operable for lowering the said elevator platform in response to the delivery thereto of a layer of articles by an amount equal to the thickness of said layer.

7. A palletizing machine according to claim 6 in which the said control means is operable after a predetermined number of layers have been delivered to said elevator platform, to discharge the entire load from the elevator platform and to then raise the elevator platform to a position immediately beneath the said receiving table.

8. A palletizing machine according to claim 1 in which control means is provided for successively lowering the elevator platform by an amount equal to the thickness of a layer of articles supplied thereto in response to the said supply, said control means being operable upon the delivery of a predetermined number of layers of articles to said elevator platform to discharge the entire load from the said elevator platform while simultaneously depositing an empty pallet sheet thereon, and for then moving the empty elevator platform upwardly to a position directly beneath the said receiving table.

References Cited in the file of this patent

UNITED STATES PATENTS

| | | |
|---|---|---|
| 1,710,552 | Rood | Apr. 23, 1929 |
| 2,323,174 | Wikle | June 29, 1943 |
| 2,405,691 | Ellis | Aug. 13, 1946 |
| 2,564,493 | Moffat | Aug. 14, 1951 |
| 2,600,747 | Faust | June 17, 1952 |
| 2,608,949 | Pasotti | Sept. 2, 1952 |
| 2,633,251 | Bruce | Mar. 31, 1953 |
| 2,701,650 | Stevenson | Feb. 8, 1955 |
| 2,703,182 | Broberg et al. | Mar. 1, 1955 |